United States Patent [19]

Petke et al.

[11] 4,299,934

[45] Nov. 10, 1981

[54] HOT MELT ADHESIVE COMPOSITION

[75] Inventors: Frederick D. Petke; Richard L. McConnell, both of Kingsport, Tenn.

[73] Assignee: Eastman Kodak Company, Rochester, N.Y.

[21] Appl. No.: 193,064

[22] Filed: Oct. 2, 1980

[51] Int. Cl.³ .............................................. C08L 67/00
[52] U.S. Cl. .................... 525/173; 428/355; 428/458; 428/480; 525/63; 525/88; 525/167; 525/169; 525/170; 525/171; 525/174; 525/177
[58] Field of Search ............... 525/63, 88, 167, 169, 525/170, 171, 173, 174, 177; 428/355, 458, 480

[56] References Cited

U.S. PATENT DOCUMENTS

| | | | |
|---|---|---|---|
| 3,795,644 | 3/1974 | Jackson, Jr. et al. | 260/22 D |
| 3,915,913 | 10/1975 | Jackson, Jr. et al. | 428/458 |
| 4,094,721 | 6/1978 | Sturm et al. | 156/306.6 |

Primary Examiner—J. Ziegler

Attorney, Agent, or Firm—John F. Stevens; Daniel B. Reece, III

[57] ABSTRACT

Hot melt adhesive compositions having low melt viscosity and high adhesive strength are disclosed. The compositions include polyesters comprising 1,6-hexanediol and terephthalic acid, blended with a polymeric material comprising a vinyl aromatic polymer derived from a monomer of the formula

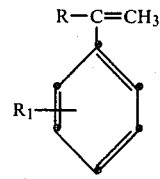

wherein R is hydrogen or an alkyl group containing 1 to 4 carbon atoms and $R_1$ is hydrogen, chlorine, alkyl from 1 to 4 carbon atoms or phenyl.

10 Claims, No Drawings

HOT MELT ADHESIVE COMPOSITION

TECHNICAL FIELD

This invention relates generally to hot melt adhesives, and more specifically, this invention relates to hot melt adhesive compositions having a relatively low melt viscosity and improved adhesion. The compositions comprise blends of polyesters with vinyl aromatic polymers.

BACKGROUND ART

Hot melt adhesives are of importance because of their speed of bonding compared with other types of adhesives. No solvents must evaporate, no curing must take place, and strong adhesive bonds are obtained as soon as the adhesive cools. Polyesters have been found useful in hot melt adhesives. Many polyesters, however, have low adhesive strength, particularly peel strength, on various uncoated substrates such as aluminum, copper, steel, glass, plastic, woods, etc., and on substrates coated with various materials, such as polyepoxide resins, vinyls, phenolics, alkyds, acrylics, etc. Another problem often encountered is that some hot melt adhesives lack the ability to maintain high adhesive strength after aging as well as the ability to maintain high bond strength under relatively high temperature conditions. Moreover, many hot melt adhesives, particularly crystalline high melting polyesters, have high melt viscosities, resulting in inferior flow and wetting properties and, therefore, must be applied at relatively high temperatures.

In U.S. Pat. No. 3,657,389, hot melt adhesive blends of poly(tetramethylene terephthalate) and polystyrene are disclosed. The adhesion to certain metals of the polyester of particular inherent viscosity (I.V.) is increased by the addition of polystyrene. A similar I.V. poly(tetramethylene terephthalate) modified with 15–20 mole percent dimer acid has low adhesion on metals, but an increase in adhesion, especially to uncoated steel, occurs when the dimer acid-modified polyester is blended with polystyrene.

U.S. Pat. No. 4,094,721 relates to copolyester adhesives derived from terephthalic acid, 1,4-butanediol and 1,6-hexanediol.

U.S. Pat. No. 3,728,212 describes blends of poly(1,4-butylene terephthalate) and selected vinyl polymers as adhesives with improved bond strength. U.S. Pat. No. 3,795,644 describes blends of copolyesters of terephthalic acid, dimer acid and 1,4-butanediol with selected vinyl aromatic polymers as adhesives with increased bond strength. U.S. Pat. No. 3,915,913 describes blends of terephthalate-based polyesters with selected vinyl aromatic polymers as hot-melt adhesives. Because plastic-grade polystyrene is used in these blends, the melt viscosities of the blends are similar to that of the unmodified polyesters.

DISCLOSURE OF INVENTION

The present invention provides blends of (a) about 50–99% by weight of a polyester derived from at least 60 mole percent 1,6-hexanediol and at least 40 mole percent terephthalic acid, based on 100 mole percent glycol and 100 mole percent dicarboxylic acid and (b) about 50–1% by weight of a vinyl aromatic polymer. Preferably, the polyester is a copolyester in which a major portion (at least 60 mole percent) of the dicarboxylic acid is terephthalic acid, and preferably the glycol component is a mixture of 1,6-hexanediol with either 1,4-butanediol or diethylene glycol. These compositions are especially useful as hot melt adhesives because of their low melt viscosity, excellent thermal stability, good adhesion to a wide variety of substrates, and sufficient compatibility that phase separation does not occur when the blends are held in the melt for several hours. Because of their low melt viscosities, these blends are readily applied with commercially available hot-melt application equipment.

BEST MODE FOR CARRYING OUT THE INVENTION

The blends according to this invention include a copolyester and a vinyl aromatic polymer. The copolyester has an I.V. of about 0.45 to about 1.2 dl/g, preferably about 0.5–0.8, and is derived from (A) a glycol component, at least about 60 mole percent of which is 1,6-hexanediol. Other glycols, aliphatic or alicyclic, straight or branched chain, containing 2 to 40 carbon atoms may also be included in the glycol component in amounts not exceeding about 40 mole percent. Most desirably, substantially all of the glycol component is 1,6-hexanediol mixed with 1,4-butanediol or diethylene glycol, (B) an acid component, at least about 40 mole percent of which is terephthalic acid. Other dicarboxylic acids, aliphatic, aromatic or alicyclic, containing from 2 to 20 carbon atoms may also be included in this component in amounts not exceeding about 60 mole percent.

Other suitable glycols include alicyclic and aliphatic glycols containing from 2 to 40 carbon atoms. The carbon chain may be straight or branched. Examples of such glycols include ethylene glycol; 1,10-decanediol; 2,2-dimethyl-1,3-propanediol; 1,4-cyclohexanedimethanol; 1,4-cyclohexanediol; triethylene glycol and dimer glycol. Other suitable dicarboxylic acids include straight and branched chain aliphatic, alicyclic and aromatic acids containing from 2 to 20 carbon atoms including maleic, dimethylmalonic, adipic, 2-methyladipic, azelaic, sebacic, isophthalic, hexahydroterephthalic, hexahydroisophthalic, trans-1,4-cyclohexanedicarboxylic, 2,5-norbornanedicarboxylic and oxydipropionic acid.

The vinyl aromatic polymers used in the adhesive blends of the invention are prepared by conventional procedures from the corresponding monomers and contain at least 50 weight percent of polymer units derived from at least one monomer having the formula:

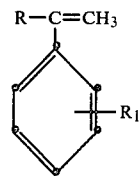

wherein R is hydrogen or an alkyl group containing 1 to 4 carbon atoms and $R_1$ is hydrogen or at least one member selected from the group consisting of chlorine, alkyl groups containing 1 to 4 carbon atoms, and phenyl.

The vinyl aromatic polymer may be a copolymer, block polymer, graft polymer, or blend containing up to 50 weight percent of polymer units derived from one or more of the following: ethylene, butadiene, vinylnaphthalene, divinylbenzene, alkyl esters of acrylic and methacrylic acids wherein the alkyl groups contain from 1 to 4 carbons, acrylonitrile, methacrylonitrile, maleic anhydride, vinyl acetate, and other polymerizable compounds containing a —CH=C< group and which give copolymers which are stable under the extrusion and bonding conditions. Polystyrene is the preferred vinyl aromatic polymer. The inherent viscosity of the vinyl aromatic polymers used in the blends of the invention may vary from about 0.03 to about 0.27, the preferred inherent viscosity is about 0.1 to about 0.27. Preferably, the ring and ball softening temperature is about 100° C.

The polyesters or copolyesters of this invention are prepared by conventional techniques, for example, by ester interchange of the glycol or glycols with the dimethyl ester of terephthalic acid or mixtures of dimethyl terephthalate and other dicarboxylic acids or esters in the presence of a titanium alkoxide catalyst. Preferably, the melting temperature (Tm) is about 80°-200° C., and the glass transition temperature (Tg) is about −30° to 25° C.

Blending of the polyesters with the vinyl polymers may be carried out by various common procedures, including mechanical mixing of the particles, blending on hot rolls, mixing in the melt in an extruder or in a sigma-blade mixer, or mixing in solution and then removing the solvent. A satisfactory procedure is to stir the two polymers together under an inert atmosphere in a flask immersed in a metal bath. A preferred method is to blend the polymer in powder or granular form and extrude with a double-screw-type extruder. The melting temperature of the blend is normally in the range of 80° to 200° C., and the melt viscosity at 190° C. is preferably between about 100 and about 1000 poise.

Substances which may be bonded by the adhesives of this invention include metals (such as steel, iron, aluminum, chromium, copper, brass, bronze, nickel, zinc, titanium, and tin), wood, glass, ceramic materials, paper, cardboard, plastics and fabrics. Substrates coated with a synthetic resin such as polyepoxide resin, epoxyphenolic resin, melamine resin, phenolic resin, alkyl resin, a vinyl, or an acrylic coating also may be bonded with the blends of this invention. The same or different materials may be bonded in one structure. It is generally advisable to clean the surfaces of the components to be bonded just prior to formation of the melt adhesive bonds to remove foreign matter, grease, oxide coatings, etc., which might interfere with the formation of strong bonds.

The adhesive may be applied in molten form with a spatula, with regular hot-melt adhesive application equipment, or with extrusion equipment to the surfaces of the components to be bonded. Alternatively, a film of the adhesive (2 to 6 mils in thickness) may be placed between the surfaces. After application of the adhesive, the surfaces are clamped together with a pressure of several pounds per square inch and heat is applied by placing the clamped structure in a forced-air oven about 20° to 50° C. above the softening range of the polyester. A convenient way of bonding metal test strips for peel tests is to heat them together on a hot plate while rubbing back and forth with a wooden spatula. No additional pressure is necessary. A glue line (adhesive thickness) of 3 to 5 mils is satisfactory.

Fillers, pigments, or processing aids, may be incorporated in the adhesive. Antioxidants and stabilizers also may be incorporated in the polymers to improve the thermal and oxidative stability at elevated temperatures.

The T-peel strengths are measured in accordance with ASTM D1876 by using precut (1-in. wide) specimens. For example, aluminum specimens are cleaned by immersing in glacial acetic acid at 80° C. for 1 hr. and rinsing well in water. The aluminum specimens are then rinsed in acetone and allowed to dry in the air. To prepare an adhesive bond, a specimen is heated sufficiently on a hot plate for the adhesive blend to melt (applied as 20-mesh to ⅛-in. particles or by rubbing a large piece back and forth). A hot plate temperature of 250° C. is generally used. After the molten polymer is evenly spread on the specimen over a 2-in. length with a wooden spatula, the top piece of metal is pressed against the sample. The sample is then turned over on the hot plate with the second metal strip against the hot plate surface. Heating is continued while the wooden spatula is rubbed back and forth over the adhesive area until a smooth, even glue line is obtained (about 20 sec.). Then the specimen is placed on the laboratory bench and rubbing continued for about 10 sec. longer while the adhesive cools. This method of forming the adhesive bonds gives reproducible results similar to those obtained by clamping the specimens together and heating in a forced-air oven 20° to 50° C. above the polymer melting point. Glue lines are about 3 to 5 mils in thickness.

Bonds may also be prepared by applying molten adhesive from suitable commercial hot-melt applicators at temperatures of about 190° to about 300° C. directly onto one substrate, positioning the second substrate, and compressing the two substrates for a few seconds until the adhesive cools.

The melt viscosities of the polyester/polystyrene blends of the examples are determined using ASTM procedure D1238, Condition 6. Tg is determined using a Perkin-Elmer Differential Scanning Calorimeter, Model 2.

Parts and percentages are by weight and temperatures are in degrees centigrade unless otherwise specified. All inherent viscosities (I.V.) are determined at 25° C. using 0.50 gram of polymer per 100 ml. of a solvent consisting of 60 percent by weight phenol and 40 percent by weight tetrachloroethane, and are given in terms of deciliters per gram (dl/g).

The following examples are submitted for a better understanding of the invention.

EXAMPLE 1

A polyester of 100 mole % terephthalic acid, 80 mole % of 1,6-hexanediol, and 20 mole % of 1,4-butanediol (polyester I; $T_m=125°$ C., $T_g=20°$ C., 0.75 I.V.), 33.8 g, and Piccolastic A-75 low-molecular-weight polystyrene (0.04 I.V.), ring and ball softening point 75° C.), 11.2 g, are blended at 175° C. in a Brabender Plasticorder sigma-blade mixer for 15 minutes under nitrogen. The blend is homogeneous in appearance and white in color. The blend has a melt viscosity of 280 P at 190° C. This blend is used to bond clean aluminum to itself at 250° C. on a hotplate for peel and shear strength testing. The bonds have average T-peel strength of 12.2 pounds per linear inch (pli) and shear strength of 853 psi. The unmodified control (1600 P at 190° C.) has peel strength under the same conditions of 6.3 pli and shear strength of 890 psi. This illustrates that blending 25 weight % of Piccolastic A-75 polystyrene into polyester I drastically reduces melt viscosity without harming the shear strength, while simultaneously improving peel strength.

EXAMPLE 2

Polyester II consists of 80 mole % of terephthalic acid and 20 mole % of isophthalic acid, 80 mole % of 1,6-hexanediol and 20 mole % of 1,4-butanediol ($T_m=104°$ C., $T_g=20°$ C., 0.72 I.V.). Three hundred grams of polyester II and 100 g of Piccolastic D-150 polystyrene (ring and ball softening point 150° C., 0.27 I.V.) are mixed in a Brabender DoCorder sigma-blade mixer at 175° C. under nitrogen for 15 minutes. The blend is homogeneous in appearance and off-white. The blend is used to bond aluminum on a hotplate at 250° C. with the following results:

| Adhesive | Melt Viscosity Poise at 190° C. | T-Peel Strength, pli | Shear Strength, psi |
|---|---|---|---|
| Polyester II Blend | 1431 | 12.8 | 808 |
| Polyester II Control | 1700 | 10.6 | 890 |

EXAMPLE 3

A blend of polyester III (80 mole % of terephthalic acid, 20 mole % of glutaric acid, 80 mole % of 1,6-hexanediol, and 20 mole % of diethylene glycol; I.V.=0.72 dl/g, $T_m=100°$ C., $T_g=-1°$ C.), 15 pounds, and Piccolastic D-100 polystyrene (ring and ball softening point 100° C., I.V.=0.11), are mixed at 140° C. in a Werner and Pfleiderer double screw extruder. The blend is white and appears to be homogeneous. The blend is applied with a Nordson Model AD-25 handgun applicator at 275° C. to form 1 inch × ½ inch lap shear bonds on sheet molding compound. The bonds made in this manner have an average shear strength of 431 psi; an unmodified control has a shear strength of 387 psi. The blend has a melt viscosity of 590 P at 190° C.; the melt viscosity of the control is 950 P at 190° C. This blend is also readily applied to substrates from Nordson Model XII and Mercer Model 20 gear pump applicators at 220° C.

Where the term polyester is used herein, it is intended that this term also include copolyesters.

The term acid is used broadly herein and is intended to include derivatives thereof, such as esters. For example, "terephthalic acid" includes derivatives thereof, such as dimethyl terephthalate.

Although the invention has been described in considerable detail with particular reference to certain preferred embodiments thereof, variations and modifications may be effected within the spirit and scope of the invention.

We claim:

1. Hot melt adhesive composition comprising
  (a) about 50–99% by weight of the composition, of a copolyester derived from at least 40 mole % terephthalic acid, and at least 60 mole % 1,6-hexanediol, said copolyester having an I.V. of about 0.45–1.2, and
  (b) about 50–1% by weight of the composition of a vinyl aromatic polymer of which at least 50% by weight of its polymeric units are derived from at least one monomer having the formula

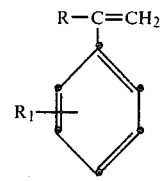

wherein R is hydrogen or an alkyl group containing 1 to 4 carbon atoms and $R_1$ is hydrogen, chlorine, phenyl or an alkyl group containing 1 to 4 carbon atoms, said vinyl aromatic polymer having an I.V. of about 0.03–0.27.

2. Hot melt adhesive composition according to claim 1 wherein said polyester is derived from at least 40 mole % terephthalic acid, at least 60 mole % 1,6-hexanediol, and about 10–40 mole % 1,4-butanediol.

3. Hot melt adhesive composition according to claim 1 wherein said polyester is derived from at least 40 mole % terephthalic acid, at least 60 mole % 1,6-hexanediol, and about 10–40 mole % diethylene glycol.

4. Hot melt adhesive composition according to claim 1 comprising about 60–90% by weight polyester and about 40–10% by weight vinyl aromatic polymer.

5. Hot melt adhesive composition according to claim 1 wherein said vinyl aromatic polymer is polystyrene.

6. Hot melt adhesive composition according to claim 1 wherein the I.V. of the polyester is about 0.5–0.8.

7. Hot melt adhesive composition according to claim 1 wherein the polyester is derived from at least 60 mole % terephthalic acid and about 40 mole % isophthalic acid.

8. Hot melt adhesive composition comprising
  (a) about 60–90% by weight of the composition, of a polyester derived from at least 40 mole % terephthalic acid, up to about 60 mole % isophthalic acid, at least 60 mole % 1,6-hexanediol, and up to about 40 mole % of a glycol selected from the group consisting of 1,4-butanediol and diethylene glycol, said polyester having an I.V. of about 0.45–1.2, and
  (b) about 40–10% by weight of the composition of polystyrene having an I.V. of about 0.03–0.27.

9. A substrate coated with the adhesive composition of claim 1.

10. A substrate coated with the adhesive composition of claim 8.

* * * * *